United States Patent [19]

Mallas

[11] Patent Number: 5,069,173

[45] Date of Patent: Dec. 3, 1991

[54] PUSH ROD HAVING IRREGULARLY SHAPED INTERNAL BORE

[75] Inventor: Angelos Mallas, Mt. Clemens, Mich.

[73] Assignee: MALL Tooling and Engineering, Mt. Clemens, Mich.

[21] Appl. No.: 679,743

[22] Filed: Apr. 3, 1991

Related U.S. Application Data

[63] Continuation-in-part of Ser. No. 446,302, Dec. 5, 1989, Pat. No. 5,027,763.

[51] Int. Cl.$^5$ ................................................ F01L 1/14
[52] U.S. Cl. ................................................ 123/90.61
[58] Field of Search ............... 123/90.61, 90.62, 90.63, 123/90.64

[56] References Cited

U.S. PATENT DOCUMENTS

| | | | |
|---|---|---|---|
| 1,594,471 | 8/1926 | Short | 123/90.61 |
| 1,663,191 | 3/1928 | Carlson | 29/888.03 |
| 1,823,419 | 9/1931 | Almen | 123/90.61 |
| 1,948,415 | 2/1934 | Cooper | 123/90.55 |
| 2,019,444 | 10/1935 | Church | 123/90.56 |
| 2,419,316 | 4/1947 | Engemann | 123/90.61 |
| 2,434,080 | 1/1948 | Rosa | 74/579 R |
| 2,743,712 | 5/1956 | Hulsing | 123/90.61 |
| 2,818,843 | 1/1958 | Frank | 123/90.61 |
| 2,851,980 | 9/1958 | Kraicinski | 72/360 |
| 2,857,895 | 10/1958 | Scheibe | 408/11 |
| 2,878,796 | 3/1959 | Mannerstedt | 123/90.39 |
| 2,897,805 | 8/1959 | Etzler | 123/90.61 |
| 2,960,080 | 11/1960 | Burnard et al. | 123/90.61 |
| 3,034,488 | 5/1962 | Reiners | 123/276 |
| 3,086,507 | 4/1963 | Mooney, Jr. | 123/90.42 |
| 3,468,007 | 9/1969 | Nakamura | 29/888.2 |
| 3,549,853 | 12/1970 | Guido et al. | 219/104 |
| 3,749,068 | 7/1973 | Andrews | 123/90.61 |
| 3,789,650 | 2/1974 | Alexoff | 72/360 |
| 4,218,996 | 8/1980 | Usui | 123/90.61 |
| 4,317,267 | 3/1982 | Usui | 29/156.7 B |
| 4,436,063 | 3/1984 | Usui | 123/90.61 |
| 4,453,505 | 6/1984 | Holtzberg et al. | 123/90.61 |
| 4,461,595 | 7/1984 | Mallas | 403/154 |
| 4,850,315 | 7/1989 | Mallas | 123/90.61 |

FOREIGN PATENT DOCUMENTS

| | | |
|---|---|---|
| 479834 | 1/1952 | Canada . |
| 640247 | 4/1962 | Canada . |
| 55-1446 | 1/1980 | Japan . |
| 55-46025 | 3/1980 | Japan . |
| 55-146211 | 11/1980 | Japan . |
| 59-155516 | 9/1984 | Japan . |
| 59-225844 | 12/1984 | Japan . |
| 61-244808 | 10/1986 | Japan . |

Primary Examiner—Raymond A. Nelli
Assistant Examiner—Weilun Lo
Attorney, Agent, or Firm—Harness, Dickey & Pierce

[57] ABSTRACT

A push rod and method of making same is provided which includes the step of cold extruding an irregularly shaped internal bore into the inner wall of an elongated hollow tube, thereby increasing the internal surface area and internal volume over conventional straight-walled tubes. In the preferred embodiment, the internal bore is defined by a cross-section of an equal number of alternately connected convex and concave portions which result in a varying wall thickness about the perimeter of the push rod. The thick wall regions are designed to be located diametrically opposite the thin wall regions.

13 Claims, 5 Drawing Sheets 100,069,173

PUSH ROD HAVING IRREGULARLY SHAPED INTERNAL BORE

CROSS REFERENCE TO RELATED APPLICATION

This application is a continuation-in-part application of U.S. patent application Ser. No. 446,302 filed Dec. 5, 1989, now U.S. Pat. No. 5,027,763, entitled "One-Piece Push Rod Having Enlarged Spherical Seat" by Mallas.

BACKGROUND OF THE INVENTION

1. Technical Field

This invention relates to push rods for engines and is especially applicable for use in high speed, high compression ratio internal combustion engines for automotive and other uses.

2. Discussion

Push rods are conventionally used between a rocker arm and cam follower in an internal combustion engine to control the opening and closing of valve seats in the engine cylinders. The following patent documents disclose a wide variety of push rod constructions: U.S. Pat. No(s). 1,594,471; 1,663,191; 1,823,419; 1,948,415; 2,019,444; 2,434,080; 2,743,712; 2,818,843; 2,851,980; 2,857,895; 2,897,805; 2,960,080; 3,034,488; 3,086,507; 3,468,007; 3,549,853; 3,789,650; 4,218,996; 4,317,267; 4,436,063; 4,453,505; 4,850,315; Canadian Patent Nos. 479,834; 640,247 and Japanese Patent Nos. 55-1446; 55-46025, 55-146211; and 59-225844.

Hollow tubular push rods are desirable because they are generally stronger and stiffer than a solid rod of the same weight. Hollow push rods having elongated straight walled tubes with spherical ends that were cold formed using a combination of a special forming tool and a punch similar to the ones disclosed in FIGS. 7 and 9 herein have been sold by the inventor of the present invention. An alternative to straight-walled push rods is described in U.S. Pat. No. 4,850,315, which is assigned to the same assignee as this present invention. More particularly, a single piece push rod is disclosed in the form of an elongated hollow tube having a middle portion with a larger outer diameter than the tube has near its ends. In a particular embodiment, the middle and end portions of the tube are cylindrical while the surfaces bridging the middle and end portions are tapered.

While such push rods have generally proven satisfactory, the present invention provides improvements thereto that are expected to provide increased performance characteristics. These characteristics are achievable with or without the use of a multiple piece construction, such as the use of inserts or the like, at the ends of the push rods as disclosed in some of the above-mentioned patent literature.

SUMMARY OF THE INVENTION

According to the teachings of the present invention, a push rod is defined as having an internal bore which is defined by an irregular surface providing an increased surface area and larger internal volume in comparison with conventional push rods having bores defined by straight-walled cylindrical surfaces. In the preferred embodiment, the internal bore is defined by a cross-section of alternately connected convex and concave portions which result in a varying wall thickness about the perimeter of the push rod. The thick wall regions are designed to be located diametrically opposite the thin wall regions.

The push rod design of the present invention is expected to exhibit increased strength as well as increased resistance to the tendency to deflect even under the operational loads of high performance engines. In addition, the flow of lubricant through the push rod is expected to be enhanced, thereby improving the thermodynamic characteristics of the lubricant. These very important advantages are believed to be obtainable while at the same time keeping the weight of the push rod to a desired minimum.

BRIEF DESCRIPTION OF THE DRAWINGS

The various advantages of the present invention will become apparent to one skilled in the art upon reading the following specification in which.

DESCRIPTION OF THE PREFERRED EMBODIMENT

It should be understood from the outset that while this invention will be described primarily in connection with one specific example, that this example is just a best mode of currently practicing this invention and that other modifications can be made to this specific example without departing from the spirit and scope of the invention.

Figure 1:
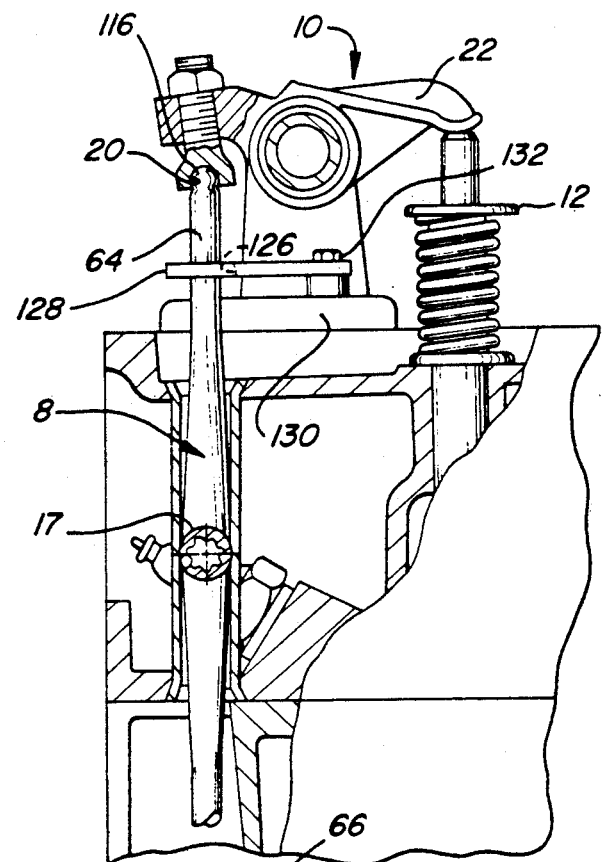
FIG. 1 is a simplified view of the push rod of the present invention having an irregularly shaped internal bore (indicated by a revolved cross-section) in use in an internal combustion engine.

Referring now to FIG. 1, a push rod 8 of the present invention is illustrated in use in an internal combustion engine 10. The conventional components of the engine 10 are best illustrated in FIG. 1 and include a plurality of cylinders (not shown) having intake and exhaust valves 12 mounted on the head (not shown). The valves 12 are operated by means of a rotatable cam 14 acting on cam follower 16. One end portion 66 of the push rod 8 having an irregularly shaped internal bore (shown by revolved section 17) is seated in a pocket 18 provided in each cam follower 16. The opposite end portion 64 of push rod 8 has a generally spherical bearing surface 116 which is fitted within a socket 20 provided in rocker 22. Rocker 22 is suitably connected to the intake or exhaust valve 12. In operation, the upward forces applied by cam 14 are translated through push rod 8 thereby causing it to open or close its associated valve 12.

Turning now to FIGS. 2 through 11, the method for fabricating a push rod according to the preferred embodiment of the present invention is illustrated. This specific example is directed toward making a push rod with an outer diameter at its ends of 5/16 inch (0.3125 inch). The starting stock is in the form of an elongated, straight-walled, hollow cylindrical tube. The tube is about 8 inches long and has a considerably larger outer diameter, preferably of about 0.375 inch, and has a wall thickness of about 0.065 inch, although different initial nominal dimensions may be used. The stock material is a chrome molybdenum alloy known in the trade as No. 4130. Although this material is presently preferred, other materials may be used.

Figure 2:
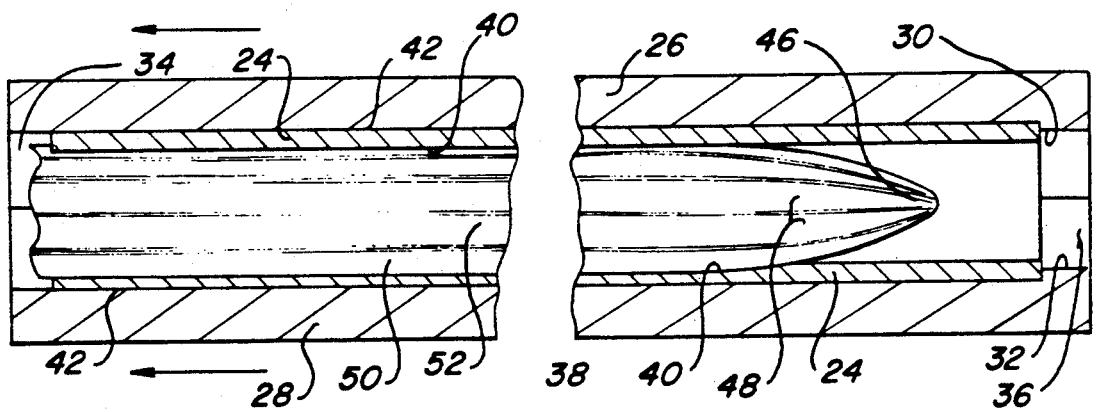
FIG. 2 is a cross-sectional view illustrating the cold extrusion operation on the internal diameter of the tubular starting stock.

FIG. 2 shows the tube 24 located in a set of holding dies 26, 28 which have mutually opposing cavities 30, 32 that correspond in shape to the outline of the tube 24. The holding dies 26, 28 fix the tube 24 in both the longitudinal and radial directions and have bore extensions 34, 36 at both ends which are dimensioned to receive a mandrel die 38 for cold extruding the inner wall 40 of the tube 24 into the desired irregular bore configuration. The holding dies 26, 28 are held together under pressure to prevent longitudinal movement of the tube 24 as well as deformation of the tube's outer surface 42 during the cold extrusion operation. FIG. 2 illustrates the extrusion operation showing the tube 24 in the holding dies 26, 28 as it is drawn over the mandrel die 38, thereby forming the irregular bore 44 in the inner wall 40 of the tube 24. In this example, the mandrel die 38 is generally torpedo-shaped having a narrowed lead-in section 46 at one end. Further, the mandrel die 38 has an irregular outer surface 48 with a mean outer diameter of about 0.265 inch that is defined by an equal number of alternately connected concave and convex portions 50, 52 (in this embodiment seven of each) with each portion having a radius of about 0.330 inch. The outer surface 48 of the mandrel die 38 reflects the irregular bore 44 design that is desired to be formed in the inner wall 40 of the tube 24. As is known in the art, the holding dies 26, 28 are shown to be moved relative to the mandrel die 38 so as to draw the tube 24 over the mandrel die 38 so that the entire longitudinal length of the inner wall 40 of the tube 24 is cold extruded into the desired irregular bore configuration.

Figure 3:
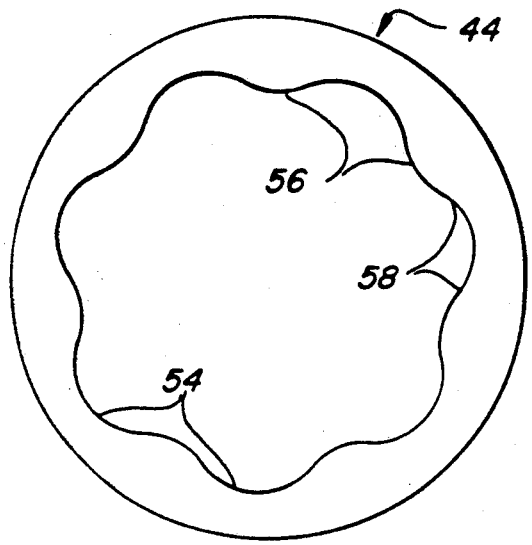
FIG. 3 is a view illustrating the cross-section of the tubular starting stock subsequent to the cold extrusion operation.

FIG. 3 illustrates the desired cross-section of the irregular bore after completion of the cold extrusion operation. FIG. 3 shows that a generally concentric, irregularly shaped internal bore 44 extends the entire longitudinal length of the tube 24 and is defined by a cross-section of 14 alternately connected convex and concave portions 54, 56 (seven convex portions 54 and seven concave portions 56) which result in a wall thickness that varies about the perimeter of the tube 24 between 0.065 inch at the center of a convex portion 54 and 0.045 inch at the center of a concave portion 56.

The transitions 58 between the convex and concave portions 54, 56 are smooth and continuous and do not have any jagged edges or abrupt peaks. An important feature of this embodiment is that the sections of the tube 24 with the larger wall thickness created by each convex portion 54 are located diametrically opposite the sections of the tube 24 with the smaller wall thickness created by each concave portion 56.

The irregular bore design of the push rod of the present invention provides an increased internal surface area and an increased internal volume in comparison with the bore designs of conventional push rods. This feature is expected to achieve the advantages of increasing the strength of the push rod, reducing its tendency to deflect under operational loads, increasing the volume and improving the flow of lubricant through the push rod, as well as keeping the weight of the push rod to a minimum.

Figure 4:
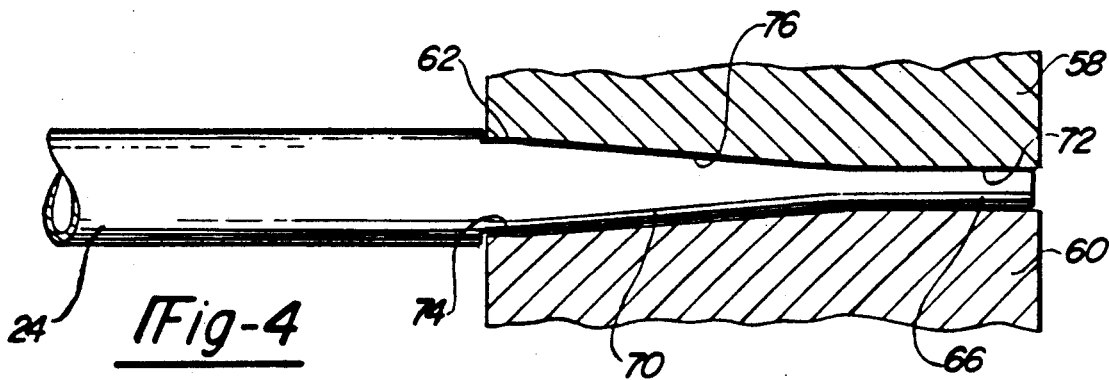
FIG. 4 is a partial cross-sectional view showing a swaging operation on a part of the original tubular starting stock.

Next, as shown in FIG. 4, one end of the tube 24 is inserted into the rotating dies 58, 60 of a swaging machine. The swaging machine, per se, is of conventional design. As is known in the art, the dies 58, 60 rotate and draw the stock inwardly while they compress the metal into the shape of the dies. In the preferred embodiment, the dies are in the desired shape of ½ of the length of the push rod.

Figure 6:
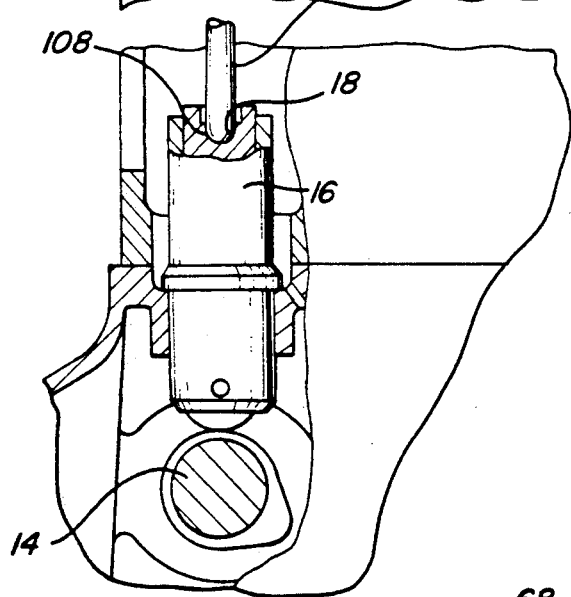
FIG. 6 is a perspective view showing the tube and its cross-section after the completion of the first swaging operation.
Figure 6:
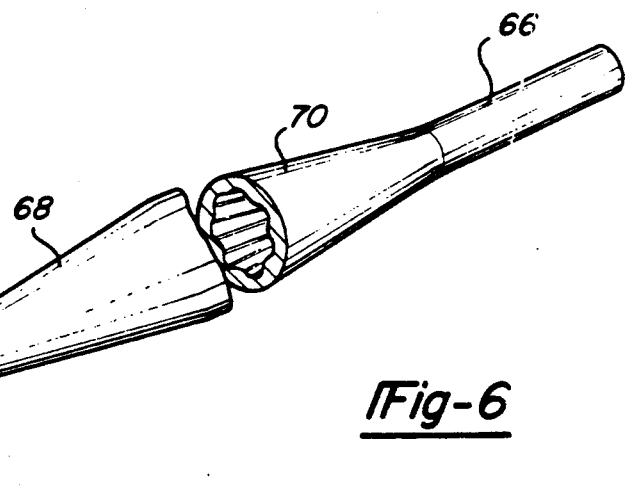
Figure 5:
FIG. 5 is a view showing the tube after completion of the first swaging operation.

The desired shape of the push rod after the swaging operation is shown in FIGS. 5 and 6. It is characterized by a relatively thick flat right cylindrical middle portion 62 which, in this example, has an outer diameter of about 0.350 inch. The outer walls of the rod then taper downwardly to end portions 64 and 66 in the form of right circular cylinders (i.e., having flat, parallel walls when viewed in cross-section), each having a radius "$R_1$" which defines an outer diameter of about 0.311 inch ($+0.005$ inch, $-0.000$ inch). Thus, end portions 64 and 66 will fit within conventional guide plates having a 5/16 inch slot. The length of end portions 64 and 66 depends upon the location of the guide plates and should for practical purposes be between ¾ and 1½ inch. In this example, the axial length of end portions 64 and 66 are each about 1.4 inch ($+0.05$ inch, $-0.000$ inch). Bridging middle portion 62 and end portions 64, 66 are conical tapered portions 68 and 70. Preferably, tapered portions 68, 70 are linear, although slightly convex surfaces should be acceptable. Concave surfaces and sharp corners are to be avoided. In this example, the axial length of the tapered portions 68, 70 are each about 2.4 inch ($+0.050$ inch).

It is preferred that the end portions 64 and 66 are compressed so that their outer diameters are between 50-90% of the outer diameter of the original tube 24. In the above example, the end portions 64 and 66 have been compressed to about 83.2% of the original outer diameter of the tube 24. Failure to reduce the end surfaces to at least 90% is disadvantageous because it probably would not result in the desired strength. On the other hand, if the end portions 64, 66 were compressed to below about 50% of the original outer diameter of the tube 24 then the inner bore would probably become closed and thereby restrict oil flow through the tube 24.

The middle portion 62 should be reduced, when necessary, to an outer diameter that is sufficiently small that it can fit within the engine block without interference and to avoid sharp corners. It may not be absolutely necessary to reduce the middle portion depending on the availability of starting stock with the appropriate size.

Figure 11:
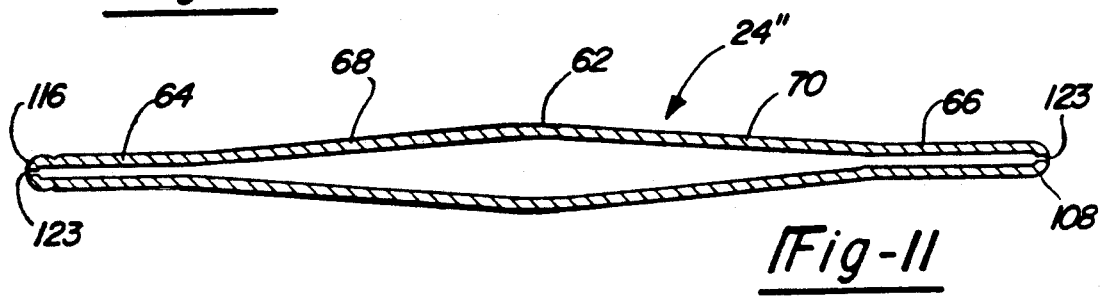
FIG. 11 is a cross-sectional view of a push rod made in accordance with the teachings of the present invention.
Figure 10A:
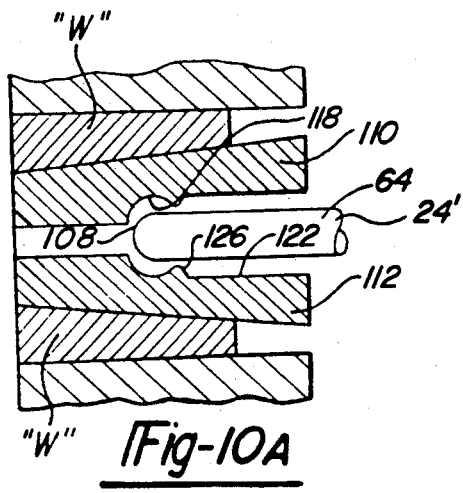
FIGS. 10A through 10C are partial cross-sectional views showing a second swaging operation for forming the enlarged spherical bearing surface.
Figure 10B:
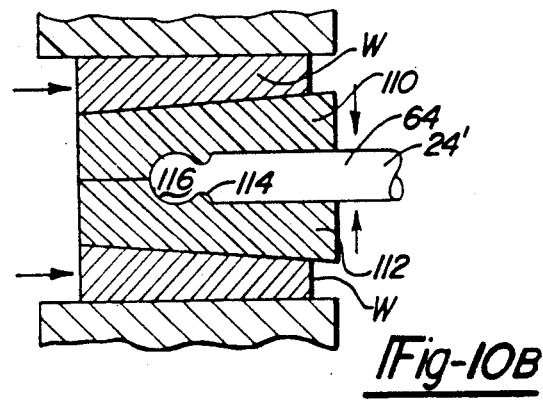
Figure 10C:
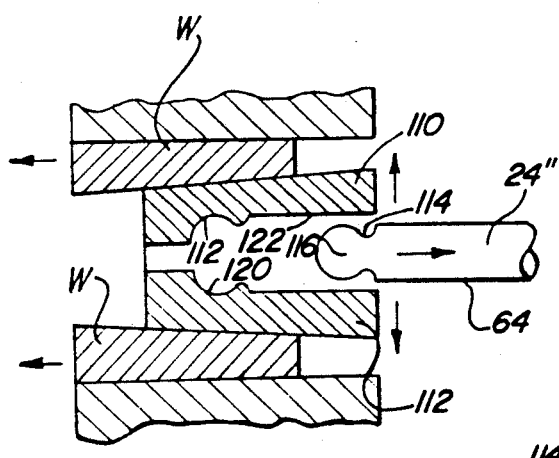

The swaging machine dies 58 and 60 are suitably shaped to meet these design constraints. Their interior surfaces define a cavity having a small right cylindrical portion 72 at the far end, a larger right cylindrical portion 74 at the front or feed end, with tapered conical portions 76 diverging from small end 72 to large end 74. The tube 24 is fed into the machine until the tube 24 reaches the point approximately shown in FIG. 4. Then the tube 24 is removed from the machine, rotated and then reinserted into the swaging machine so that the dies can swage the opposite half of the rod. As noted before, FIGS. 5 and 6 illustrate the rod after the swaging or die drawing operation. Wall thickness is constant as seen in FIGS. 6 and 11.

Figure 7:
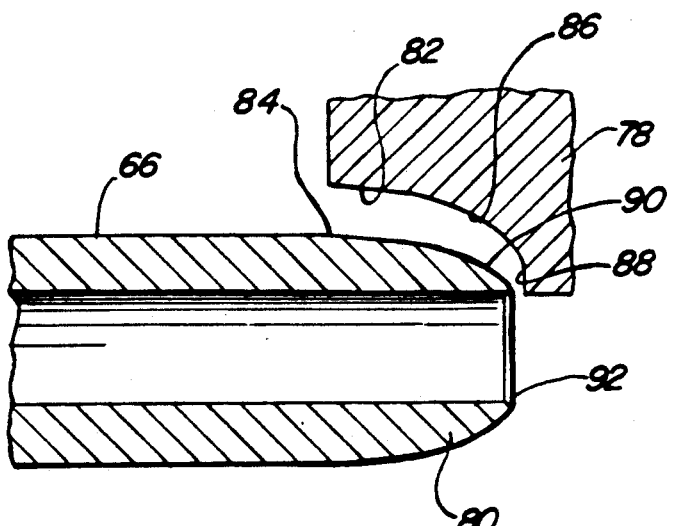
FIG. 7 is a partial cross-sectional view illustrating a tip of the tube after it has been machined with the form tool which is also shown therein.

Turning now to FIG. 7, the tips of end portions 64 and 66 are both machined with a forming tool 78 to form a generally conical taper 80 thereon which is about 0.210 inch in length. This is preferably accomplished by placing the tube in a lathe and rotating the workpiece while forming tool 78 removes metal in the shape of its cutting surfaces. In this embodiment, the cutting surface of the forming tool 78 begins with a line segment or flat 82 which extends at about an 8° angle to the major axis of the tube. The flat 82 in tool 78 forms a corresponding flat conical surface 84 on taper 80. The flat 82 blends into an arc 86 in forming tool 78. The arc 86 has a radius of approximately 0.450 inch (+0.015 inch) whose center is offset from end face 88 by about 0.200 inch. The arc 86 in forming tool 78 thus forms a corresponding arc surface 90 on the tips. A small chamfer 92 on the tips can optionally be formed to remove burrs and the like which may be created during machining with the forming tool 78. It should be understood that both ends or tips are, or can be, likewise formed into the general shape shown in FIG. 7.

Figure 8:
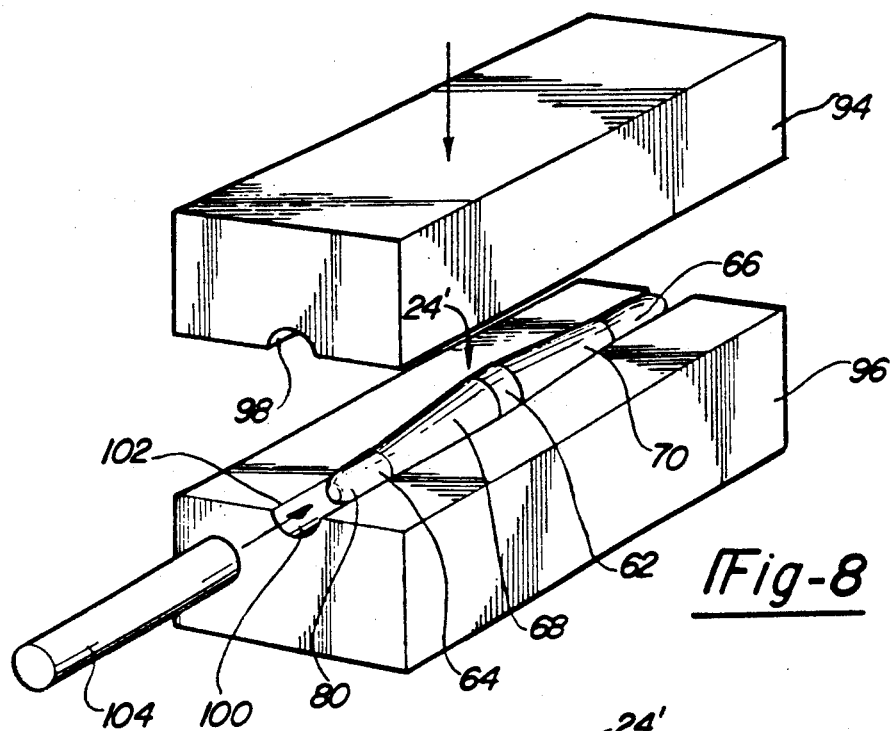
FIG. 8 is a perspective view showing the tube in a subsequent stage of operation.
Figure 9:
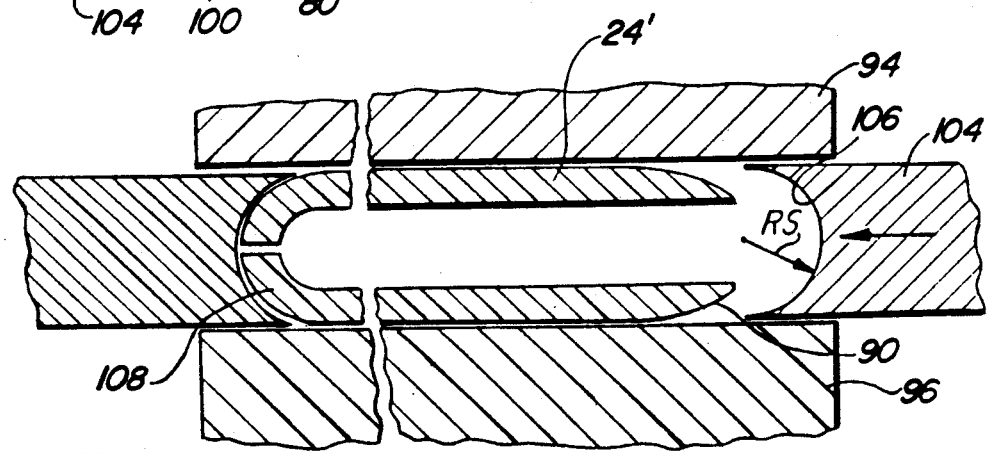
FIG. 9 is a before and after partial cross-sectional view which illustrates the formation of the hemi-spherical bearing surface on the tips of the tube by a cold forming operation utilizing a punch which contacts the ends of the rods.

Turning now to FIGS. 8 and 9, the next step in the method is to place semi-formed tube 24' into a set of holding dies 94 and 96. The holding dies 94, 96 have mutually opposing cavities 98 and 100 respectively, which correspond in shape to the outline of tube 24' and have bore extensions 102 at both ends dimensioned to receive punches 104 for cold forming the tips of the tube 24'. The holding dies 94, 96 are held together under pressure to prevent movement of tube 24' during the cold forming operation which is shown best in FIG. 9. The right hand portion of FIG. 9 illustrates the relative shape of the rod tips before they are struck with punch 104, whereas the left hand portion of FIG. 9 shows the shape of the tips after being cold formed. The punch 104 includes a concave 180° hemi-spherical striking surface 106 having about the desired diameter of the tips of the push rod. In this example, striking surface 106 has a radius "R" of about 0.151 (+0.003 inch, −0.000) which approximates the desired 5/16 diameter bearing surface for the desired end product. The opposite end of punch 104 is struck with sufficient force to cause the metal to flow together and form a substantially hemi-spherical bearing surface 108 which has a substantially the same wall thickness as the wall thickness of the remaining portion of the rod. More specifically, bearing surface 108 defines 180° of arcuate revolution of radius "$R_S$" relative to a central longitudinal axis of tube 24'. Radius "$R_S$" is substantially equal to Radius "$R_1$" of end portions 64 and 66 thereby creating a smooth transition between bearing surface 108 and an outer surface of the respective end portions.

The next step in the method is to enlarge the generally hemi-spherical bearing surface 108 by extending the arc of revolution of radius "$R_S$" to be greater than 180°, and preferably to at least 210°. Preferably, one of the end portions 64 and 66 is inserted into rotating dies 110 and 112 of a swaging machine. The general swaging process is illustrated in reference to FIGS. 10A through 10C. Again, the swaging machine, per se, is of conventional design. As is known in the art, dies 110, 112 are driven radially inwardly by wedges "W" and rotate while they compress the metal into the shape of the dies. In the preferred embodiment, the dies 110, 112 are configured to generate an annular groove or recess 114 in tube 24". The annular groove 114 is configured to extend the generally hemi-spherical bearing surface 108 from 180° of rounded surface to at least approximately 210° of spherical surface. The enlarged or extended spherical bearing surface portion is designated by reference numeral 116. Furthermore, annular groove 114 has a first groove surface defining the portion of bearing surface 116 which was extended. Specifically, the first groove surface defines the extended spherical surface extending from about 180° to preferably at least 210° of arcuate revolution of radius "$R_S$". A second groove surface connects the first groove surface to an outer surface of the end portion. Preferably, the second groove surface interfaces with the first groove surface at the point where the extended spherical bearing surface terminates (approximately 210° of spherical arcuate revolution of radius "$R_S$").

The swaging machine dies 110 and 112 are suitably shaped to meet the desired design requirements. Their interior surfaces define a cavity having at least approximately 210° of spherical bearing surface portion 118 at the far end, a return tapered portion 120 defining the second groove surface of annular groove 114, and a generally right cylindrical portion 122 at the feed end. Cylindrical portion 122 is of substantially the same diameter as that of the push rod portion it supports, such as end portion 64.

After this second swaging operation, tube 24" is in the desired final configurations and represents the push rod 2 of the present invention as shown in FIG. 11. Holes 123 are drilled through the tips to insure that oil flow is not impeded and to remove burrs, fragmented metal and the like.

Figure 12:
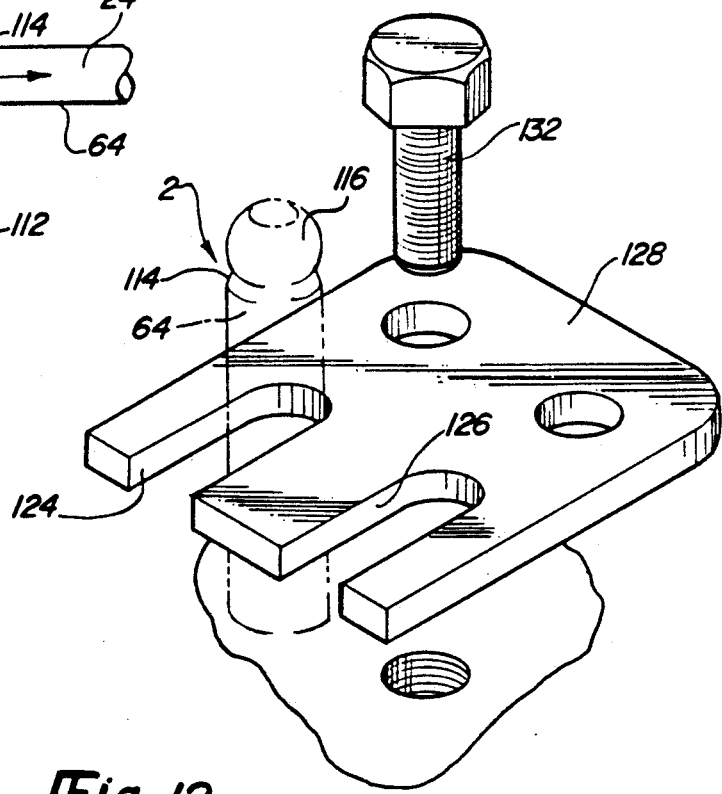
FIG. 12 is a perspective view of the push rod and a typical guide plate.

FIGS. 1 and 12 illustrate the push rod 8 in use in a conventional internal combustion engine 10. As previously described, engine 10 includes a plurality of cylinders (not shown) having intake and exhaust valves 12 mounted on the head (not shown). The valves 12 are opened by means of a rotatable cam 14 that pushes upward on cam follower 16. The bearing surface 108 on end portion 66 of push rod 8 fits within a pocket 18 in cam follower 16. Extended bearing surface 116 on opposite end portion 64 engages socket 20 formed in rocker 22. Rocker 22 is suitably connected to the intake or exhaust valve 12. End portion 64 rides within one of the slots 124, 126 formed in guide plates 128 which is suitably attached to block 130 via fasteners 132. Guide plates 128 serve to prevent lateral movement of push rods and are often found in many high performance engines. They can be located at various locations within the engine. Thus, the length of the end portion 64 of push rod 8 should be sufficient to accommodate for these different locations and for the reciprocal movement of the push rod. In operation, the upward forces applied by cam 14 are translated through push rod 8 upwardly to rocker 22 causing it to open or close its associated valve 12. The internal bore of push rod 8 is used as a passageway for supplying lubricant to the various engine components.

The present invention, while disclosed in combination with tapered one-piece push rods, is likewise applicable to two- and three-piece push rod designs as well as push rod designs having a uniform outer diameter across their entire length.

It can be appreciated that the bore design of the push rod of the present invention which is defined by an irregular surface provides an increased internal surface area and an increased internal volume in comparison with the bore designs of conventional push rods which are defined by straight-walled cylindrical surfaces. The irregular bore design is expected to increase the strength of the push rod, and together with the tapered outer surfaces and/or spherical bearing surfaces combine to counter forces which cause bending in the push rod. Such bending is to be avoided because it can detrimentally effect the performance of the engine. In addition, the volume and flow of lubricant through the push rod is enhanced thereby improving the thermodynamic characteristics of the lubricant. Further, the push rod is relatively light weight, as compared with solid rods and thereby increases the efficiency of the engine. Finally, the design of the present invention does not require any modification of the other engine components and, in fact, can be interchangeable with conventional push rods.

Various other advantages and modifications will become apparent to one skilled in the art after having the benefit of studying the teachings of this specification, drawings and following claims.

What is claimed is:

1. A push rod for an internal combustion engine comprising:
an elongated one piece hollow metal tube having radiused bearing surfaces located at the outer tips thereof, said tube having a single, generally concentric inner bore extending throughout the longitudinal length thereof, said bore having an irregularly shaped cross section being defined by alternately connected convex and concave portions, said convex portions being located diametrically opposite of said concave portions, and said tube having a substantially circular outer circumference.

2. The push rod of claim 1 wherein said bore has an equal number of said convex and concave portions.

3. The push rod of claim 1 wherein said tube has a substantially constant mean wall thickness throughout the longitudinal length thereof.

4. The push rod of claim 3 wherein said tube has a uniform outer diameter with a substantially flat cylindrical outer surface throughout the longitudinal length thereof.

5. The push rod of claim 3 wherein said tube has a middle portion and first and second end portions, said middle portion having a greater outer diameter than said end portions.

6. The push rod of claim 5 wherein the outer surfaces of said tube between said middle portion and said end portions form a symmetrically linear taper extending from said middle portion to said end portions.

7. The push rod of claim 6 wherein said middle portion and said end portions have substantially flat cylindrical outer surfaces, said outer surfaces being parallel.

8. The push rod of claim 1 wherein at least one of said bearing surfaces is defined by an arc of revolution extending through an angle of up to 180°.

9. The push rod of claim 1 wherein at least one of said bearing surfaces is generally spherical and defined by an arc of revolution extending through an angle of at least approximately 210°.

10. The push rod of claim 1 further comprising, in combination, an internal combustion engine having a cam follower, a rocker and a guide plate having a slot therein, and wherein said push rod slides in said slot.

11. In an internal combustion engine having a push rod acting between a rocker assembly and a cam follower assembly in which the push rod slides in a slot in a guide plate, the improvement wherein:
said push rod being an elongated one piece hollow metal tube having radiused bearing surfaces located at the outer tips thereof, said tube having a single, generally concentric bore extending throughout the longitudinal length thereof, said bore having an irregularly shaped cross section being defined by alternately connected convex and concave portions, said convex portions being located diametrically opposite said concave portions, at least one of said bearing surfaces being in direct engagement with said rocker assembly or said cam follower assembly, said tube having a substantially constant mean wall thickness and a substantially circular outer circumference throughout the longitudinal length thereof.

12. The improvement of claim 11 wherein said bore has an equal number of said convex and concave portions.

13. The improvement of claim 1 wherein said tube has a middle portion and first and second end portions, said middle portion having a greater diameter than said end portions, said middle and end portions having substantially flat, cylindrical, parallel outer surfaces with a symmetrically linear taper extending between said middle portion and said end portions, at least one of said bearing surfaces is generally spherical and defined by an arc of revolution extending through at least approximately 210°.

* * * * *